United States Patent
Stankevichus

(10) Patent No.: US 10,705,761 B2
(45) Date of Patent: Jul. 7, 2020

(54) METHOD OF AND SYSTEM FOR SCHEDULING TRANSMISSION OF I/O OPERATIONS

(71) Applicant: YANDEX EUROPE AG, Lucerne (CH)

(72) Inventor: Aleksey Alekseevich Stankevichus, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 16/383,976

(22) Filed: Apr. 15, 2019

(65) Prior Publication Data

US 2020/0089432 A1 Mar. 19, 2020

(30) Foreign Application Priority Data

Sep. 14, 2018 (RU) .................................. 2018132714

(51) Int. Cl.
*G06F 3/06* (2006.01)
*G06F 9/48* (2006.01)

(52) U.S. Cl.
CPC .......... *G06F 3/0659* (2013.01); *G06F 3/0611* (2013.01); *G06F 3/0673* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 5,247,677 A | 9/1993 | Welland et al. | |
| 5,278,984 A | 1/1994 | Batchelor | |

(Continued)

FOREIGN PATENT DOCUMENTS

| | | | |
|---|---|---|---|
| CN | 105653365 A | 6/2016 | |
| CN | 103514037 B | 6/2018 | |

(Continued)

OTHER PUBLICATIONS

Russian Search Report dated Oct. 30, 2019 issued in respect of the Russian Patent Application No. RU2018136221.

(Continued)

*Primary Examiner* — Edward J Dudek, Jr.
*Assistant Examiner* — Ralph A Verderamo, III
(74) *Attorney, Agent, or Firm* — BCF LLP

(57) ABSTRACT

A method and a system for scheduling transmission of a plurality of input/output (I/O) operations to be executed by a storage device comprising: applying a slidable cell window to sequential I/O operations from a scheduled sequence, the slidable cell window being positioned over the sequential I/O operations starting with the first I/O operation, transmitting to the storage device the sequential I/O operations, receiving an operation execution confirmation from the storage device, determining a position of a given cell of the slidable cell window associated with the I/O operation, responsive to a position of the given cell being the first position of the slidable cell window: sliding the slidable cell window over the plurality of I/O operations so as to include at least one additional I/O operation in the slidable cell window, and transmitting to the storage device, the at least one additional I/O operation for execution.

26 Claims, 6 Drawing Sheets

(56) References Cited

U.S. PATENT DOCUMENTS

| | | | |
|---|---|---|---|
| 5,577,202 A | 11/1996 | Padgett | |
| 5,640,563 A | 6/1997 | Carmon | |
| 5,845,316 A | 12/1998 | Hillyer et al. | |
| 6,023,720 A | 2/2000 | Aref et al. | |
| 6,757,897 B1 | 6/2004 | Shi et al. | |
| 6,791,992 B1 | 9/2004 | Yun et al. | |
| 6,851,115 B1 | 2/2005 | Cheyer et al. | |
| 6,859,931 B1 | 2/2005 | Cheyer et al. | |
| 7,073,021 B2 * | 7/2006 | Iren | H04N 21/2326 348/E5.008 |
| 7,177,866 B2 | 2/2007 | Holenstein et al. | |
| 7,474,989 B1 | 1/2009 | Wilcoxon | |
| 7,562,362 B1 | 7/2009 | Paquette et al. | |
| 8,117,621 B2 | 2/2012 | Singh et al. | |
| 8,145,838 B1 | 3/2012 | Miller et al. | |
| 8,595,302 B2 | 11/2013 | Krishnamurthi et al. | |
| 8,799,913 B2 | 8/2014 | Yoo et al. | |
| 8,826,301 B2 | 9/2014 | Kim et al. | |
| 8,838,539 B1 | 9/2014 | Ashcraft et al. | |
| 8,850,018 B2 | 9/2014 | Massa et al. | |
| 8,850,446 B2 | 9/2014 | Avni et al. | |
| 8,930,954 B2 | 1/2015 | Hildrum et al. | |
| 8,966,490 B2 | 2/2015 | Avni et al. | |
| 9,047,331 B2 | 6/2015 | Rao et al. | |
| 9,203,900 B2 | 12/2015 | Rao et al. | |
| 9,251,195 B2 | 2/2016 | Yamada | |
| 9,304,694 B2 | 4/2016 | Colgrove et al. | |
| 9,348,592 B2 * | 5/2016 | Jha | G06F 9/30014 |
| 9,354,813 B1 | 5/2016 | Dolan et al. | |
| 9,400,682 B2 | 7/2016 | Persikov et al. | |
| 9,477,521 B2 | 10/2016 | Truong et al. | |
| 9,569,339 B1 | 2/2017 | Villalobos et al. | |
| 9,639,396 B2 | 5/2017 | Pho et al. | |
| 9,699,017 B1 | 7/2017 | Gupta et al. | |
| 9,921,557 B2 | 3/2018 | Slupik et al. | |
| 2004/0213387 A1 | 10/2004 | Chandrasekaran | |
| 2005/0047425 A1 | 3/2005 | Liu et al. | |
| 2007/0002750 A1 | 1/2007 | Sang et al. | |
| 2007/0226332 A1 | 9/2007 | Becker-Szendy et al. | |
| 2007/0268516 A1 | 11/2007 | Bugwadia et al. | |
| 2008/0168452 A1 * | 7/2008 | Molaro | G06F 11/1435 718/103 |
| 2009/0013154 A1 | 1/2009 | Du et al. | |
| 2009/0292744 A1 | 11/2009 | Matsumura | |
| 2010/0011182 A1 * | 1/2010 | Le Moal | G11B 20/10 711/167 |
| 2010/0185847 A1 | 7/2010 | Shasha et al. | |
| 2011/0145830 A1 | 6/2011 | Yamaguchi | |
| 2011/0153566 A1 | 6/2011 | Larson et al. | |
| 2011/0219100 A1 | 9/2011 | Dhuse et al. | |
| 2011/0261698 A1 | 10/2011 | Kamerkar et al. | |
| 2012/0047317 A1 | 2/2012 | Yoon et al. | |
| 2013/0132057 A1 | 5/2013 | Deng et al. | |
| 2013/0191836 A1 | 7/2013 | Meyer | |
| 2014/0019987 A1 | 1/2014 | Verma et al. | |
| 2014/0208327 A1 | 7/2014 | Cadambi et al. | |
| 2014/0250438 A1 | 9/2014 | Shin et al. | |
| 2015/0128149 A1 | 5/2015 | Meijer et al. | |
| 2015/0347185 A1 * | 12/2015 | Holt | H04L 49/00 718/102 |
| 2015/0347211 A1 | 12/2015 | Dang et al. | |
| 2016/0188376 A1 | 6/2016 | Rosas et al. | |
| 2016/0266934 A1 | 9/2016 | Rimoni | |
| 2016/0291885 A1 | 10/2016 | Pendharkar et al. | |
| 2017/0031713 A1 | 2/2017 | Campbell et al. | |
| 2017/0109203 A1 | 4/2017 | Liu et al. | |
| 2017/0147488 A1 | 5/2017 | Vaquero | |
| 2017/0177697 A1 | 6/2017 | Lee et al. | |
| 2017/0374516 A1 | 12/2017 | Huo et al. | |
| 2018/0041477 A1 | 2/2018 | Shaposhnik | |
| 2018/0052710 A1 | 2/2018 | Choi et al. | |
| 2018/0101448 A1 | 4/2018 | Ventura et al. | |
| 2018/0114290 A1 | 4/2018 | Paltashev et al. | |
| 2018/0157543 A1 | 6/2018 | Bellomo et al. | |

FOREIGN PATENT DOCUMENTS

| | | |
|---|---|---|
| EA | 031078 B1 | 11/2018 |
| EP | 2110990 A1 | 10/2009 |
| EP | 1508850 A3 | 3/2015 |
| GB | 2351375 A | 12/2000 |
| RU | 2376635 C2 | 12/2009 |
| RU | 2388039 C2 | 4/2010 |
| RU | 2494453 C2 | 9/2013 |
| RU | 2533638 C2 | 11/2014 |
| RU | 2543558 C2 | 3/2015 |
| RU | 2547705 C2 | 4/2015 |
| RU | 2581551 C2 | 4/2016 |
| RU | 2628146 C2 | 8/2017 |
| RU | 2649788 C1 | 4/2018 |
| RU | 2665212 C2 | 8/2018 |
| RU | 2670573 C2 | 10/2018 |
| WO | 2012065018 A2 | 5/2012 |
| WO | 2016197716 A1 | 12/2016 |

OTHER PUBLICATIONS

Grefen et al. "Two-Layer Transaction Management for Workflow Management Applications", Database and Expert Systems Applications, pp. 430-439, publication date: Sep. 1997430-439.

"Deadline scheduler", retrieved on Wikipedia on Jan. 21, 2019.

"Shortest seek first", retrieved on Wikipedia on Jan. 21, 2019.

"Elevator algorithm", retrieved on Wikipedia on Jan. 21, 2019.

Abeni et al, "Constant Bandwidth Server Revisited", EWiLi'14, Nov. 2014, Lisbon, Portugal.

Virtuozzo Storage 2.3, Installation Guide, Dec. 14, 2017, retrieved from https://docs.virtuozzo.com/virtuozzo_storage_2_installation_guide/planning-virtuozzo-storage-infrastructure/understanding-data-redundancy.html.

Russian Search Report dated Feb. 25, 2020 issued in respect of the Russian Patent Application No. RU2018147497.

Russian Search Report dated Feb. 25, 2010 issued in respect of the Russian Patent Application No. RU2018135460.

Russian Search Report dated Nov. 8, 2019 issued in respect of the Russian Patent Application No. RU2018132711.

Russian Search Report dated Nov. 26, 2019 issued in respect of the Russian Patent Application No. RU2018144176.

Russian Search Report dated Nov. 26, 2019 issued in respect of the Russian Patent Application No. RU2018132714.

Russian Search Report dated Nov. 25, 2019 issued in respect of the Russian Patent Application No. RU2018135452.

Ex Parte Quale Action dated Apr. 23, 2020 received in respect of a related U.S. Appl. No. 16/383,976.

* cited by examiner

METHOD OF AND SYSTEM FOR SCHEDULING TRANSMISSION OF I/O OPERATIONS

CROSS-REFERENCE

The present application claims priority to Russian Patent Application No. 2018132714, entitled "Method of and System for Scheduling Transmission of I/O Operations," filed Sep. 14, 2018, the entirety of which is incorporated herein by reference.

FIELD

The present technology relates to data processing in general and specifically to a method and a system for scheduling and controlling transmission of Input/Output (I/O) operations for execution by an uncontrolled device.

BACKGROUND

Input/Output (I/O) operations refer to read or write operations that are performed by a processing entity on a storage device, as an example. Generally, such operations are scheduled by operating systems executing I/O scheduling algorithms in order to decide on the sequence and the order of the I/O operations to be submitted to the storage devices for processing thereof. In order to minimize time wasted by a storage device, such prior art processes seek to prioritize certain processes' I/O requests, as an example to minimize physical arm movement in hard disk drives (HDDs), for sharing disk bandwidth with other processes, and to guarantee that certain requests will be issued before a particular deadline. This process typically results in a generation of an I/O operations queue, which queue defines the order of transmission of the I/O operations to the disk subsystem which includes storage devices (such as HDDs, solid-state drives (SDDs), and the like).

Generally, storage devices operate their own device-internal logic for selectively deciding in which order operations in a queue of I/O operations should be executed, and the device-internal logic may chose the most beneficial I/O operations for execution at each iteration, as an example to optimize throughput of the storage device, or due to other reasons. Thus, the storage device may keep "skipping" the execution of "less" beneficial I/O operations (as seen by the device-internal logic of the storage device) in the scheduled sequence of operations. Thus, the less beneficial I/O operations to execute in the scheduled sequence of the storage device may remain unprocessed in the storage device for a long time. For example, at each iteration, the device-internal logic may select the most beneficial I/O operation and, due to the constant maintenance of the sequence, the less beneficial I/O operation may simply be "stuck" or "starved" in that sequence for a while due to significant disordering. This may result in an execution deadline associated with the starved I/O operation to be missed.

U.S. Pat. No. 8,117,621 B2 granted on Feb. 14, 2012 to International Business Machines Corp and titled "Simulating a multi-queue scheduler using a single queue on a processor" teaches a method and system for scheduling tasks on a processor, the tasks being scheduled by an operating system to run on the processor in a predetermined order, the method comprising identifying and creating task groups of all related tasks; assigning the tasks in the task groups into a single common run-queue; selecting a task at the start of the run-queue; determining if the task at the start of the run-queue is eligible to be run based on a pre-defined timeslice allocated and on the presence of older starving tasks on the runqueue; executing the task in the pre-defined time slice; associating a starving status to all unexecuted tasks and running all until all tasks in the run-queue complete execution and the run-queue become empty.

United States Patent Application Publication No. 2017/0031713 A1 published on Feb. 2, 2017 to Arm Ltd. and titled "Task scheduling" teaches an apparatus comprising scheduling circuitry, which selects a task as a selected task to be performed from a plurality of queued tasks, each having an associated priority, in dependence on the associated priority of each queued task. Escalating circuitry increases the associated priority of each of the plurality of queued tasks after a period of time. The plurality of queued tasks comprises a time-sensitive task having an associated deadline and in response to the associated deadline being reached, the scheduling circuitry selects the time-sensitive task as the selected task to be performed.

U.S. Pat. No. 9,639,396 granted on May 2, 2017 to NXP USA Inc and titled "Starvation control in a data processing system" teaches a data processing system including a main list of tasks, main scheduling scheme, a starvation list of tasks, and a secondary scheduling scheme. A method identifies tasks in the main list that are potentially-starving tasks and places the potentially-starving tasks in the starvation list. A starvation monitor controls starvation of tasks in the system by determining when to use the secondary scheduling scheme to schedule, for execution on a CPU, a highest priority task in the starvation list prior to scheduling, pursuant to the main scheduling scheme, other tasks in the main list. The starvation monitor determines a number of times that a task in the main list is pre-empted, by other tasks in the main list, from being scheduled for execution on the CPU. A counter is incremented each occasion that any task not in the starvation list is executed on the CPU.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

The present technology may allow, among other things, to employ a variety of storage devices in a real-time distributed system, may allow decreasing response time for executing a task provided to a storage device, as well as minimize starvation of tasks without implementing additional hardware or computational resources in a real-time distributed system.

Embodiments of the present technology have been developed based on developers' appreciation that storage devices employ device-internal logic for executing a sequence of I/O operations, which may not be controllable by other entities (such as the supervisory entities that execute scheduling of I/O operations and generation of I/O operations queues). Further, the developer(s) have appreciated that sending tasks one-by-one to "control" execution of I/O operations by the storage device may be time consuming and less efficient than sending a sequence of I/O operations.

More specifically, the present technology is directed to application of a "slidable window" over a scheduled sequence of I/O operations to selectively transmit a given number of I/O operations for execution by an uncontrolled storage device. Such a slidable window may allow "forcing"

the uncontrolled storage device to execute I/O operations that are only included in the slidable window.

In accordance with a first broad aspect of the present technology, there is provided a method of scheduling transmission of a plurality of input/output (I/O) operations to be executed by a storage device. The storage device is part of a computer system, and the computer system has: an operations scheduler executing a scheduling algorithm for scheduling the plurality of I/O operations for transmission to the storage device, where the operations scheduler is configured to generate a scheduled sequence having the plurality of I/O operations ordered starting with a first I/O operation to be transmitted and finishing with a last I/O operation to be transmitted. The computer system has an I/O operations dispatch controller communicatively coupled to the operations scheduler and the storage device. The storage device is configured to execute an execution order algorithm to determine an execution order of I/O operations having been transmitted from the operations scheduler for execution. The method is executable by the I/O operations dispatch controller. The method comprises: applying a slidable N-cell window to select N sequential I/O operations from the scheduled sequence, where the slidable N-cell is positioned over the N sequential I/O operations starting with the first I/O operation, each cell of the slidable window including a respective one of the N sequential I/O operations. The method comprises transmitting to the storage device the N sequential I/O operations. The method comprises receiving an execution confirmation from the storage device that is indicative of a given I/O operation from the N sequential I/O operations that has been been processed by the storage device. The method comprises determining a position of a given cell of the slidable N-cell window associated with the given I/O operation. The method comprises, in response to the position of the given cell being the first position amongst positions of cells of the slidable N-cell window: sliding the slidable N-cell window over the plurality of I/O operations so as to include at least one additional I/O operation in the slidable N-cell window, where the at least one additional I/O operation is immediately sequential in the scheduled sequence of the plurality of I/O operations to the N sequential I/O operations. The method comprises transmitting to the storage device, the at least one additional I/O operation for execution.

In some embodiments of the method, the method further comprises: responsive to the position of the given cell not being the first position amongst the positions of the cells of the N-cell window: blocking the slidable N-cell window from sliding over the scheduled sequence of the plurality of I/O operations.

In some embodiments of the method, the at least one additional I/O operation is present within the scheduled sequence. The transmitting the at least one additional I/O operation to the storage device is executed at the same time as the execution confirmation is received.

In some embodiments of the method, the at least one additional I/O operation is not present within the scheduled sequence. The transmitting the at least one additional I/O operation to the storage device is executed after the execution confirmation is received as soon as the at least one additional I/O operation is received from the operations scheduler and is added to the scheduled sequence.

In some embodiments of the method, the receiving the execution confirmation comprises receiving a plurality of confirmations corresponding to a plurality of sequential I/O operations from the N sequential I/O operations having been processed by the storage device. The sliding of the slidable window is executed over a number of X-cells, the number of X-cells corresponding to a number of executed sequential I/O operations in the plurality of I/O operations starting with the first I/O operation.

In some embodiments of the method, the I/O operations dispatch controller is implemented as a software module.

In some embodiments of the method, the I/O operations dispatch controller is implemented as a state machine.

In some embodiments of the method, the software module is located on the storage device.

In some embodiments of the method, the scheduling algorithm is FAIR-principle based.

In some embodiments of the method, the storage device is implemented as a fault tolerant device.

In some embodiments of the method, the execution order algorithm is uncontrollable by the task scheduler.

In some embodiments of the method, the method further comprises executing, by the storage device the given I/O operation.

In some embodiments of the method, the method further comprises transmitting, by the storage device to the I/O operations dispatch controller, information indicative of the given I/O operation having been executed.

In accordance with a second broad aspect of the present technology, there is provided a system for scheduling transmission of a plurality of input/output (I/O) operations to be executed by a storage device connected to the system. The system has an operations scheduler executing a scheduling algorithm for scheduling the plurality of I/O operations for transmission to the storage device, where the operations scheduler is configured to generate a scheduled sequence having the plurality of I/O operations ordered starting with a first I/O operation to be transmitted and finishing with a last I/O operation to be transmitted. The system has an I/O operations dispatch controller communicatively coupled to the operations scheduler and the storage device. The storage device is configured to execute an execution order algorithm to determine an execution order of I/O operations having been transmitted from the operations scheduler for execution. The system comprises: a processor, a non-transitory computer-readable medium comprising instructions, where the processor, upon executing the instructions, is configured to cause the I/O operations dispatch controller to: apply a slidable N-cell window to select N sequential I/O operations from the scheduled sequence, where the slidable N-cell is positioned over the N sequential I/O operations starting with the first I/O operation, and where each cell of the slidable window includes a respective one of the N sequential I/O operations. The processor is configured to to cause the I/O operations dispatch controller to transmit to the storage device the N sequential I/O operations. The processor is configured to receive an execution confirmation from the storage device that is indicative of a given I/O operation from the N sequential I/O operations having been processed by the storage device. The processor is configured to cause the I/O operations dispatch controller to determine a position of a given cell of the slidable N-cell window associated with the given I/O operation. The processor is configured to cause the I/O operations dispatch controller to, in response to the position of the given cell being the first position amongst positions of cells of the slidable N-cell window: slide the slidable N-cell window over the plurality of I/O operations so as to include at least one additional I/O operation in the slidable N-cell window, the at least one additional I/O operation being immediately sequential in the scheduled sequence of the plurality of I/O operations to the N sequential I/O operations. The processor is configured to to cause the I/O operations dispatch controller to transmit to the storage device, the at least one additional I/O operation for execution.

In some embodiments of the system, the processor is further configured to cause the I/O operations dispatch controller to: responsive to the position of the given cell not being the first position amongst the positions of the cells of the N-cell window: block the slidable N-cell window from sliding over the scheduled sequence of the plurality of I/O operations.

In some embodiments of the system, the at least one additional I/O operation is present within the scheduled sequence. The transmitting the at least one additional I/O operation to the storage device is executed at the same time as the execution confirmation is received.

In some embodiments of the system, the at least one additional I/O operation is not present within the scheduled sequence. The transmitting the at least one additional I/O operation to the storage device is executed after the execution confirmation is received as soon as the at least one additional I/O operation is received from the operations scheduler and is added to the scheduled sequence.

In some embodiments of the system, the receiving the execution confirmation comprises receiving a plurality of confirmations corresponding to a plurality of sequential I/O operations from the N sequential I/O operations having been processed by the storage device. The sliding of the slidable window is executed over a number of X-cells, the number of X-cells corresponding to a number of executed sequential I/O operations in the plurality of I/O operations starting with the first I/O operation.

In some embodiments of the system, the I/O operations dispatch controller is implemented as a software module.

In some embodiments of the system, the I/O operations dispatch controller is implemented as a state machine.

In some embodiments of the system, the software module is located on the storage device.

In some embodiments of the system, the scheduling algorithm is FAIR-principle based.

In some embodiments of the system, the storage device is implemented as a fault tolerant device.

In some embodiments of the system, the execution order algorithm is uncontrollable by the task scheduler.

In some embodiments of the system, the processor is further configured to cause the I/O operations to execute of the given I/O operation by the storage device.

In some embodiments of the system, the processor is further configured to cause the I/O operations to transmit, by the storage device, information indicative of the given I/O operation having been executed.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION OF NON-LIMITING EMBODIMENTS

The present detailed description is intended to be only a description of illustrative examples of the present technology. This description is not intended to define the scope nor set forth the bounds of the present technology. In some cases, helpful examples of modifications may be set forth as an aid to understanding the present technology, and not to define the scope or set forth the bounds of the present technology. These modifications are not an exhaustive list and other modifications are likely possible.

Further, where this has not been done (i.e. where no examples of modifications have been set forth), it should not be interpreted that no modifications are possible and/or that what is described is the sole manner of implementing that particular aspect of the present technology. In addition it is to be understood that the present detailed description provides in certain instances simple implementations of the present technology, and that where such is the case they have been presented in this manner as an aid to understanding. Various implementations of the present technology may be of a greater complexity.

Figure 1:
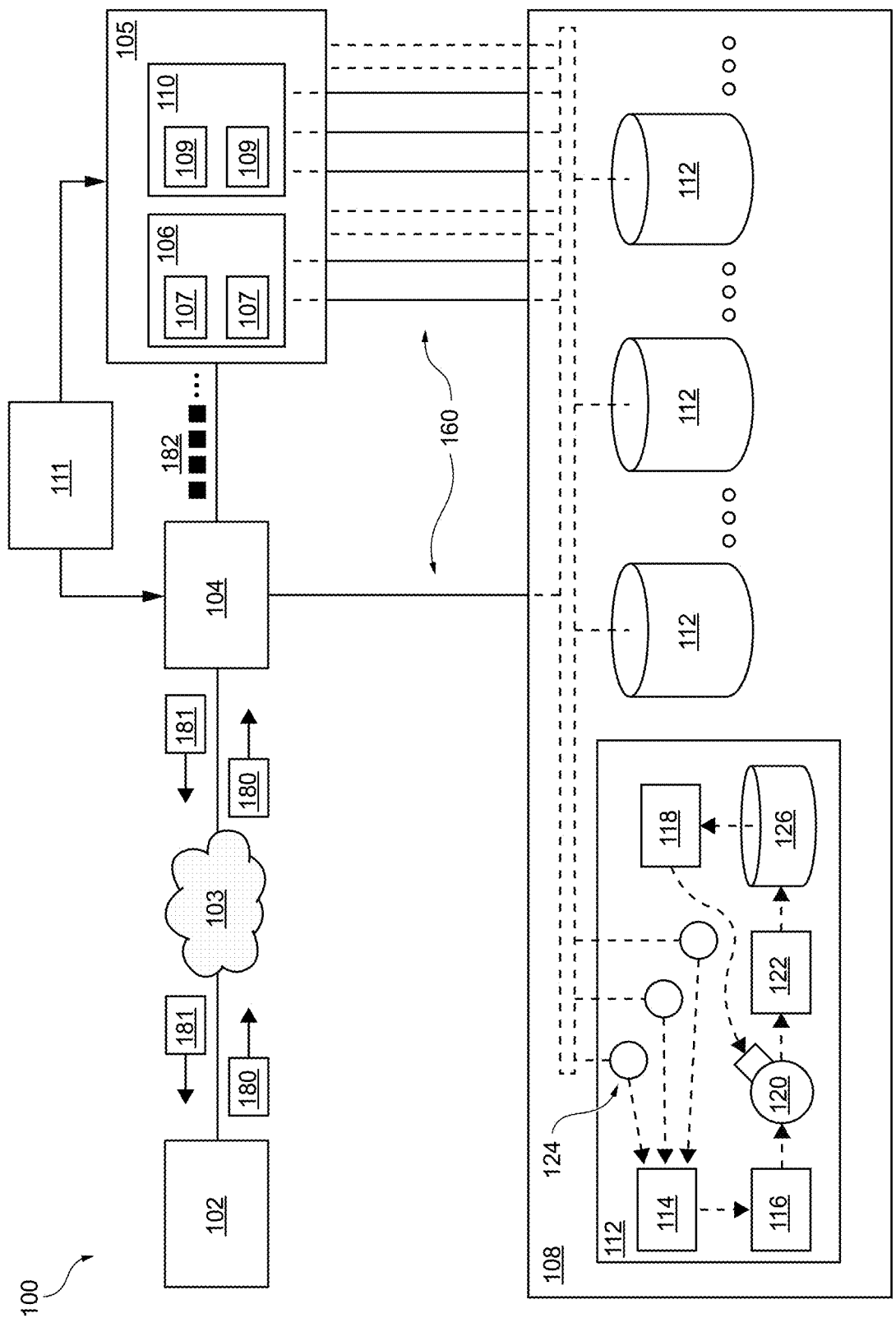
FIG. 1 depicts a schematic diagram of a distributed computer-processing system implemented in accordance with non-limiting embodiments of the present technology.

Referring to FIG. 1, there is depicted a distributed computer-processing system 100 or a "distributed processing system" 100, for short. The distributed processing system 100 is configured for implementing non-limiting embodiments of the present technology. It is to be expressly understood that the distributed processing system 100 as depicted is merely an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the distributed processing system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the distributed processing system 100 may provide in certain instances simple implementations of the present technology, and that where such is the case they have been presented in this manner as an aid to understanding. As persons skilled in the art would understand, various implementations of the present technology may be of a greater complexity.

The distributed processing system 100 comprises a request source 102, a communication network 103, a request pre-processing sub-system 104, a transaction processing sub-system 105, a transaction routing sub-system 106, a distributed storage sub-system 108, a database sub-system 110, and an operational sub-system 111.

How the above listed components of the distributed processing system 100 are implemented in accordance to the various non-limiting embodiments of the present technology will now be described.

Request Source

The request source 102 may be an electronic device associated with an end user (e.g., a client device) or, alternatively, any other sub-system of the distributed processing system 100 that is configured to provide user requests for the distributed processing system 100. It should be expressly understood that even though FIG. 1 depicts only a single instance of the request source 102, the distributed processing system 100 may have multiple instances of the request source 102. As illustrated herein, the request source 102 is part of the distributed processing system 100, however, in some embodiments of the present technology, the request source 102 may be external to the distributed processing system 100, and connected via a communication link (not numbered).

In fact, a typical implementation of the distributed processing system 100 can include a large number of request sources 102, such as hundred instances, thousand instances, million instances, and the like.

In some embodiments of the present technology, where the distributed processing system 100 is employed in a business-to-customer (B2C) environment, the request source 102 may be a given client device, such as a smartphone, for example, associated with a given user of the distributed processing system 100. For example, the distributed processing system 100 may potentially provide cloud storage services for the given client device of the given user.

In other embodiments of the present technology, where the distributed processing system 100 is employed in a business-to-business (B2B) environment, the request source 102 may be a given sub-system, such as a remote server, for example, providing user requests to the distributed processing system 100. For example, in some embodiments of the present technology, the distributed processing system 100 may provide fault-tolerant data processing and/or storage services for an operator of the given sub-system.

Broadly speaking, irrespective of whether the distributed processing system 100 is implemented as a B2C or a B2B system (or any other variation of the system for that matter), the request source 102 may be a given client device or another sub-system which can be internal or external to the distributed processing system 100.

As mentioned above, the request source 102 is configured to issue a plurality of requests 180, each of which will be referred herein below as the request 180. The nature of the request 180 will depend on a type of the request source 102. However, one example of the request 180 is a query expressed in Structured Query Language (SQL). Therefore, it is contemplated that in some embodiments of the present technology, the request 180 may be expressed in a declarative programming language, which means that the request 180 may be a declarative-type request.

Generally speaking, declarative programming is a style of building a structure and elements of computer programs that expresses the logic of a computation without describing a control flow thereof. Common declarative programming languages include, but are not limited to, SQL, XQuery and other database query languages. Broadly speaking, a declarative-type request is one that specifies an action in terms of "what" needs to be executed, as opposed to how "how" it needs to be executed.

This means that a given declarative-type request may be associated with a given condition under which a given action should be executed. The given condition may be, for example, a condition on which entity the given action is to be executed or where to obtain values for the given action to be executed.

As non-limiting examples, the given declarative-type request can be formulated such as: "Upsert a value of 5 in a cell associated with a key that is equal to a value of a cell associated with a key A" and "For all keys associated with a cell having a value of 5, replace that value with a value 10". However, it should be understood that examples of declarative languages and examples of declarative-type requests have been provided above for ease of illustration only, and that other declarative languages and other declarative-type requests may be used by the request source 102, without departing from the scope of the present technology.

In some embodiments of the present technology, the request source 102 is also configured to receive a plurality of responses 181, each of which will be referred herein below as the response 181. Generally speaking, in response to the request 180 being processed (or potentially not processed) by the distributed processing system 100, the distributed processing system 100 may generate the response 181 destined to the request source 102 associated with the respective request 180. The nature of the response 181 will depend on inter alia a type of the request source 102, the type of the respective request 180 and whether the distributed processing system 100 processed (or potentially not processed) the respective request 180. In some embodiments of the present technology, the distributed processing system 100 may generate the response 181 only in case of a failure to process the request, only in case of a successful processing of the request, or both.

In one example, during processing of the request 180, the distributed processing system 100 may be configured to request additional data from the request source 102 for continuing or completing processing of the request 180. In such a case, the distributed processing system 100 may be configured to generate the response 181 in a form of a data-request message being indicative of additional data requested by the distributed processing system 100 for continuing or completing the processing of the request 180.

In another example, if the distributed processing system 100 successfully processed the respective request 180, the distributed processing system 100 may be configured to generate the response 181 in a form of a success message being indicative of successful processing of the respective request 180.

In a further example, if the distributed processing system 100 failed to successfully process the respective request 180, the distributed processing system 100 may be configured to generate the response 181 in a form of a failure message being indicative of failed processing of the respective request 180. In such a case, the request source 102 may be configured to perform additional actions such as, but not limited to, re-issuing the request 180, performing diagnostic analyzes for identifying the reason of failed processing of the request 180 by the distributed processing system 100, issuing a new request destined to the distributed processing system 100, and the like.

Communication Network

The request source 102 is communicatively coupled to the communication network 103 for providing the request 180 to the distributed processing system 100 and for receiving the response 181 from the distributed processing system 100. In some non-limiting embodiments of the present technology, the communication network 103 can be implemented as the Internet. In other non-limiting embodiments of the present technology, the communication network 103 can be implemented differently, such as any wide-area communication network, local-area communication network, a private communication network and the like. How a communication link (not separately numbered) between the request source 102 and the communication network 103 is implemented will depend on inter alia how the request source 102 is implemented.

Merely as an example and not as a limitation, in those embodiments of the present technology where the request source 102 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the request source 102 is implemented as a remote server, the communication link can be either wireless (such as Wireless Fidelity, or WiFi® for short, Bluetooth® or the like) or wired (such as an Ethernet based connection).

It should be noted that the communication network 103 is configured to transmit inter alia a request data-packet comprising the request 180 from the request source 102 to the request pre-processing sub-system 104 of the distributed processing system 100. For example, this request data-packet may comprise computer-executable instructions written in a given declarative-type programming language which represent the request 180. The communication network 103 is also configured to transmit inter alia a response data-packet comprising the response 181 from the distributed processing system 100 to the request source 102. For example, this response data-packet may comprise computer-executable instructions representing the response 181.

However, it is contemplated that, in some embodiments of the present technology, where the request source 102 is a given sub-system of the distributed processing system 100, for example, the communication network 103 may be implemented in a different manner from what is described above or, in some cases, may even be omitted, without departing from the scope of the present technology.

Operational Sub-System (Hive)

As mentioned above, the distributed processing system 100 comprises the operational sub-system 111, or simply "the hive", for short. Generally speaking, the hive 111 is a given software-based application (for example, a state machine) that is configured to manage at least some sub-systems of the distributed processing system 100, such as the request pre-processing sub-system 104, and the transaction processing sub-system 105, for example. It can be said that the hive 111 may be embodied as a given State Machine (SM) that is configured to generate, delete and/or balance load of other SMs forming the at least some sub-systems of the distributed processing system 100.

It should be understood that a given SM is a computational model employed by computer systems and which is defined by a list of "states". The given SM may change its current state in response to some external input and may be in exactly one state at any given moment in time. A change from a given state to another state of the given SM is called a "state transition".

It should be noted that, in the context of the present technology, the SMs forming the at least some sub-systems of the distributed processing system 100 are deterministic in nature, that is, each state transition of each such SM is uniquely determined by (i) a current state of a respective SM and (ii) a given external input provided to the respective SM. In other words, for a given current state of the respective SM and for a given external input, there is a unique next state of the respective SM. This deterministic nature of the state transition is true irrespective of which SM of the distributed processing system 100 is undergoing the state transition.

Therefore, as it will be described further below, in some embodiments of the present technology, the distributed processing system 100 may need to receive external inputs of a particular type that satisfy this deterministic property of the SMs of the at least some sub-systems of the distributed processing system 100.

Distributed Storage Sub-System

As mentioned above, the distributed processing system 100 also comprises the distributed storage sub-system 108. Generally speaking, the distributed storage sub-system 108 is configured to inter alia store "system data" indicative of states, state transitions, external inputs and/or outputs of at least some of the SMs of the distributed processing system 100. For example, the system data associated with a given SM of the distributed processing system 100 may be stored in a form of a log, and where the log is indicative of a historical listing of states, state transitions, external inputs and/or outputs of the given SM.

The distributed storage sub-system 108 is also configured to store "client data"—i.e. data associated with the processed external inputs by the distributed processing system 100. For example, in some embodiments of the present technology, client data may be stored as part of the system data in the distributed storage sub-system 108 without departing from the scope of the present technology.

In order to store the system data and/or the client data, the distributed storage sub-system 108 comprises a plurality of storage devices 112, each of which will be referred herein below as the storage device 112. In accordance with the various embodiments of the present technology, some or all of the plurality of storage devices 112 can be located in a single location or distributed amongst different locations. For example, some or all of the plurality of storage devices 112 can be located in a single server rack and/or a single data center and/or distributed over a plurality of server racks in one or more data centers.

In some embodiments of the present technology, the system data and/or the client data stored by a given storage device 112 may be replicated and stored on more than one other storage devices 112. In these embodiments, such replication and storing of the system data and/or the client data may result in a fault-tolerant storage of the system data and/or the client data by the distributed processing system 100. Fault-tolerant storage of the system data and/or the client data may allow preventing data loss in cases where a given storage device 112 of the distributed storage sub-system 108 becomes, temporarily or permanently, unavailable for storage and data retrieval purposes. Also, this fault-tolerant storage of the system data and/or the client data may allow preventing data loss in cases where a given SM of the distributed processing system 100 becomes, temporarily or permanently, unavailable.

It is contemplated that the storage device 112 may be implemented as a computer server. The computer server comprises at least one physical memory device (i.e. a memory drive 126) and hosts one or more software applications configured to execute computer-readable instructions. The memory drive 126 can be executed as solid state drive (SSD), hard disk drive (HDD), or the like. Therefore, it can be said that the at least one physical memory device can be implemented as either a movable disk type device or a immovable (static) disk type device.

For example, as depicted in FIG. 1, a given storage device 112 may be configured to host software applications, such as, but not limited to: (i) a virtual-drive (Vdrive) application 114, a physical-drive (Pdrive) application 115, at least one drive model application 118, at least one operation scheduling application 120, a real-time operation enforcing application 122, and at least one SM proxy 124. Functionalities of the above listed software applications and of the memory drive 126 for storing at least some system data and/or the client data will be described in greater detail further below with reference to FIG. 2.

Request Pre-Processing Sub-System

As previously alluded to, the transaction processing sub-system 105 may be formed by a number of deterministic SMs that require receiving external inputs of a particular type and which satisfy the deterministic property of the deterministic SMs. It should also be recalled that the request source 102 issues the request 180 in a form of a declarative-type request.

As such, the request pre-processing sub-system 104 is configured to receive the request 180, which is the declarative-type request originated from the request source 102, and to pre-process/translate the request 180 into a plurality of deterministic transactions 182 that satisfy the deterministic property of the number of deterministic SMs forming the transaction processing sub-system 105.

Therefore, broadly speaking, the purpose of the request pre-processing sub-system 104 is to ensure that the transaction processing sub-system 105 is able to process the request 180 by pre-processing/translating the request 180 into a plurality of transactions 182 that are processable by the deterministic SMs of the transaction processing sub-system 105.

It should be noted that the request pre-processing sub-system 104 is also configured to generate the response 181 to be transmitted to the request source 102. Indeed, the request pre-processing sub-system 104 is communicatively coupled to the transaction processing sub-system 105, not only to transmit thereto the plurality of deterministic transactions 182, but also to receive therefrom information regarding processing of the plurality of deterministic transaction 182. In some of the non-limiting embodiments of the present technology, the plurality of deterministic transactions 182 can be of one or more of any of a "write" type and a "read" type.

In some embodiments of the present technology, the request pre-processing sub-system 104 is implemented as at least one SM, without departing from the scope of the present technology.

In some embodiments of the present technology, it is contemplated that the distributed computer-processing system 100 of FIG. 1 may support ACID transactions. Broadly speaking, ACID (atomicity, consistency, isolation and durability) is an acronym for a set of transaction properties which are directed to maintain database reliability when transactions are executed. Therefore, in some embodiments of the present technology, it is contemplated that transactions destined to the transaction processing sub-system 105 may be atomical, consistent, isolated and durable, without departing from the scope of the present technology.

Transaction Processing Sub-System

Generally speaking, the transaction processing sub-system 105 is configured to receive and process the plurality of deterministic transactions 182, thereby processing the request 180 of the request source 102. The transaction processing sub-system 105 includes (i) the transaction routing sub-system 106 and (ii) the database sub-system 110, which will now be described in turn.

The database sub-system 110 includes a plurality of transaction destination locations (TDLs) and is partitioned into a plurality of shards 109, each of which will be referred herein below as the shard 109. In one non-limiting example, the database sub-system 110 may host a database having a given database table (or more than one). The given database table may be composed of at least two columns, such as a first column having keys and a second column having records that store data in association with the respective keys. In this non-limiting example, a given TDL may correspond to a given row of the given database table, that is, the given TDL may correspond to a given key and a respective record in the given database table.

As such, in this non-limiting example, each shard 109 of the database sub-system 110 hosts a portion of the given database table. Hence, the given plurality of TDLs, corresponding to the respective rows of the given database table, is split between the plurality of shards 109 such that each shard 109 comprises a respective subset (e.g. range) of the given plurality of TDLs.

In some embodiments of the present technology, it is contemplated that each one of the plurality of shards 109 may be implemented by a respective deterministic SM. This means that, upon receiving a given transaction destined to a TDL of a given shard 109 implemented by a given SM, the given SM may process the transaction and thereby transition to a new state thereof from a current state thereof based on the given transaction, as explained above.

The transaction routing sub-system 106 is configured to route transactions from the plurality of deterministic transaction 182 to respective TDLs and, therefore, to the respective shards 109 of the database sub-system 110. To that end, the transaction routing sub-system 106 may be formed by a plurality of ports that are generally configured to (i) receive the plurality of deterministic transactions 182 from the request pre-processing sub-system 104, (ii) order the plurality of deterministic transactions 182 into subsets of deterministic transactions destined to respective shards 109, and (iii) generate centralized per-shard orders for execution by the respective shards 109 of the deterministic transactions in each one of the centralized per-shard orders of execution.

It should be noted that each one of the plurality of ports forming the transaction routing sub-system 106 may be implemented as a respective SM. In some embodiments, it is contemplated that the plurality of ports may comprise two different types of ports for routing transactions from the plurality of deterministic transactions 182 to the respective shards 109. In other embodiments, at least some functionalities of the plurality of ports may be executed by the SMs corresponding to the plurality of shards 109.

Also, as depicted in FIG. 1, at least some of the SMs of the transaction processing sub-system 105 may be communicatively coupled to the distributed storage sub-system 108 by a respective communication link 160. Broadly speaking, the purpose of a given communication link 160 is to convey system data indicative of inter alia states, state transitions, external inputs and/or outputs of respective SMs to the distributed storage sub-system 108 for storage thereof. How the communication links 160 are established and how the distributed storage sub-system 108 is configured to store the system data will now be described in greater detail with reference to FIG. 2.

Figure 2:
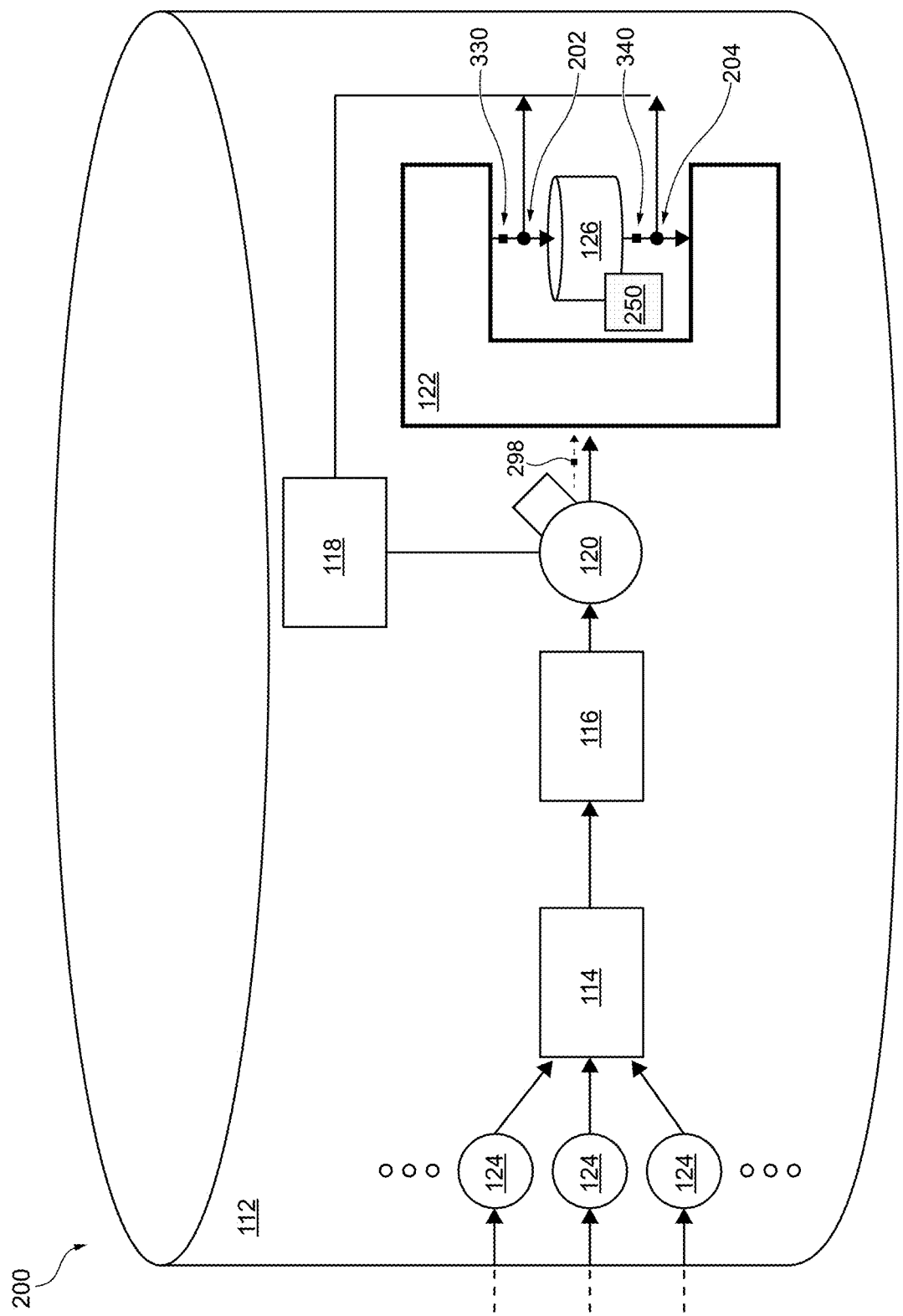
FIG. 2 depicts a storage device part of the computer-processing system of FIG. 1 implemented in accordance with non-limiting embodiments of the present technology.

In FIG. 2, there is depicted the storage device 112 which is part of the distributed storage sub-system 108. As previously mentioned, the storage device 112 comprises the at least one SM proxy 124. The purpose of a given SM proxy is to manage communication between a given SM and the distributed storage sub-system 108. In some embodiments of the present technology, it is contemplated that the at least one SM proxy 124 of the storage device 112 may be an Application Programing Interface (API) managing communication between a given SM and the storage device 112. In other embodiments of the present technology, the at least one SM proxy 124 itself can be implemented as a SM. In other embodiments of the present technology, the at least one SM proxy 124 can be implemented as a software module (not in itself a SM) for executing functions described immediately above.

In some embodiments of the present technology, a given SM proxy 124 may be configured to (i) receive system data indicative of a log update of a given SM via a respective communication link 160, (ii) process the system data, and (iii) transmit the processed system data to a respective Vdrive application 114 for further processing.

The at least one SM proxy 124 may be configured to process the system data, for example, for ensuring consistency and fault-tolerance of the system data. It is contemplated that the at least one SM proxy 124 may be configured to perform erasure-coding of system data, in some embodiments of the present technology. Broadly speaking, erasure-coding is an encoding method in which data is provided with redundancy and is then split into several fragments. Such redundancy provision and fragmentation may facilitate restoration of data if one ore more fragments are lost due to faults in a given system.

It is contemplated that the so-processed system data by the at least one SM proxy 124 is received by the at least one respective Vdrive application 114 of the storage device 112. The purpose of a given Vdrive application 114 is to process the system data received from the at least one SM proxy 124 and, in response, generate corresponding I/O operations that are to be executed by the memory drive 126 for storing the system data on the memory drive 126 of the storage device 112. Once the at least one Vdrive application 114 generates the I/O operations corresponding to the system data received thereby, the at least one Vdrive application 114 then transmits the I/O operations to the Pdrive application 116.

As such, it is contemplated that a given storage device 112 may have more than one SM proxies 124 for processing and transmitting system data to more than one respective Vdrive application 114, which in turn process the system data, generate respective I/O operations, and transmit the respective I/O operations to a single Pdrive application 116 of the storage device 112.

Broadly speaking, the purpose of the Pdrive application 116 is to control operation of the memory drive 126. For example, the Pdrive application 116 may be configured to perform encoding of I/O operations to be executed on the memory drive 126 and various other functionalities that facilitate reliable storage of data on the memory drive 126.

The Pdrive application 116 is commutatively coupled to the operation scheduling application 120 to transmit thereto the I/O operations. The operation scheduling application 120 is configured for scheduling the transmission of the I/O operations to the memory drive 126. It is contemplated that the operation scheduling application 120, or simply "scheduler" for short, may execute various scheduling schemes for determining an order in which the I/O operations are to be transmitted to the memory drive 126 for further execution.

It is contemplated that, in some embodiments of the present technology, operation scheduling application 120 may be implemented as part of the Pdrive application 116. In other words, execution of various scheduling schemes may be performed by the Pdrive application 116, without departing from the scope of the present technology.

In one case, operation scheduling application 120 may provide a scheduling scheme of a "fair" type. It should be understood that a given storage device 112 may require to store I/O operations corresponding to system data associated with more than one SMs. Also, each one of the more than one SMs is associated with a pre-determined proportion of drive bandwidth that the memory drive 126 may allocate for executing the I/O operations associated with that respective SM. Therefore, broadly speaking, fair-type scheduling schemes are configured to order the I/O operations to be transmitted to the memory drive 126 such that the drive bandwidth of the memory drive 126 for executing the ordered I/O operations is used in accordance with the pre-determined proportions associated with the more than one SMs.

In another case, operation scheduling application 120 may provide a scheduling scheme of a "real-time" type. It should be recalled that the distributed processing system 100 may be employed for providing cloud storage services. In many such implementations, it may be desirable to process system data and store it according to real-time requirements or, in other words, within a very short interval of time. As such, in order to support real-time requirements of the distributed processing system 100, the I/O operations may be associated with respective deadlines that are indicative of a moment in time after which the execution of the respective I/O operations is no longer performed within an acceptable amount of time for supporting real-time requirements of the distributed processing system 100. Therefore, broadly speaking, real-time scheduling schemes are configured to order the I/O operations to be transmitted to the memory drive 126 such that the I/O operations are to be executed by the memory drive 126 within respectively associated deadlines.

In a further case, operation scheduling application 120 may provide a hybrid scheduling scheme. In other words, operation scheduling application 120 may provide a scheduling scheme that is able to order the I/O operations for transmission of the memory drive 126 for execution such that the pre-determined proportions of drive bandwidth for each respective SM is respected and that respective deadlines of the I/O operations are also respected.

As previously mentioned, the memory drive 126 is a storage medium for executing I/O operations and thereby storing system data transmitted to the storage device 112. For example, the memory drive 126 may be implemented as an HDD or an SSD. The memory drive 126 includes a drive-internal logic 250 for selecting a given I/O operation for current execution amongst all I/O operations transmitted thereto.

It should be noted that I/O operations may potentially be sent one-by-one for execution to the memory drive 126, but this would result in an increased latency between the memory drive 126 and other components of the storage device 112. Therefore, the I/O operations may also be transmitted in batches or groups of I/O operations to the memory drive 126. Once a batch or group of I/O operations is received by the memory drive 126, the drive-internal logic 250 is configured to select amongst the I/O operations available thereto (from the batch) a most efficient I/O operation for execution.

For example, the most efficient I/O operation may be selected based on a variety of criteria such as, for example, a location where a previous I/O operation has been executed on the memory drive 126 and locations of the I/O operations available to the memory drive 126 where they are ought to be executed on the memory drive 126. In other words, the drive-internal logic 250 is configured to select, for current execution, a most efficient one (from the perspective of the memory drive 126) amongst all the I/O operations available to the memory drive 126 at a given moment in time.

For that reason, in some cases, although operation scheduling application 120 may have ordered I/O operations in a specific order of transmission for respecting the real-time requirements of the distributed processing system 100, the drive-internal logic 250 of the memory drive 126 may instruct the memory drive 126 to organize them in an execution order that is different from the transmission order selected by operation scheduling application 120. Therefore, it may happen that the execution order may no longer respect the real-time requirements of the distributed processing system 100 (especially as additional I/O operations are received from operation scheduling application 120, which additional I/O operations may be more "efficient" from the perspective of the memory drive 126 and that may be picked over non-yet-executed I/O operations). In some embodiments of the present technology, the operation scheduling application 120 may execute a FAIR-principle based algorithm, also known as fair queuing, to achieve fairness when a limited resource is shared in the distributed processing system 100.

In order to ensure real-time operation of the storage device 112 and to avoid the above-described problem (which is also known as "operation stagnation"), the storage device 112 may include an I/O operations dispatch controller, which will be referred to as the real-time operation enforcing application 122. Broadly speaking, the real-time operation enforcing application 122 allows controlling which I/O operations amongst those that have been already ordered by operation scheduling application 120 are transmitted at any given time to the memory drive 126 for execution.

It is contemplated that, in some embodiments of the present technology, the real-time operation enforcing application 122 may be implemented as part of the Pdrive application 116. In other words, the above-mentioned functionalities of the real-time operation enforcing application 122 may be performed by the Pdrive application 116, without departing from the scope of the present technology.

In some embodiments, the real-time operation enforcing application 122 may implement an input counter 202 which is configured to transmit and count I/O operations that are sent to the memory drive 126 via data packets 330. The real-time operation enforcing application 122 may also implement an output counter 204 to intercept and count I/O operation execution confirmations that are sent by the memory drive 126 via confirmation data packets 340.

The storage device 112 is also configured to host at least one respective drive model application 118 for each memory drive 126 of the storage device 112. Broadly speaking, the drive model application 118 is configured to emulate ideal operation of the memory drive 126 for diagnostic analyses of the memory drive 126. The drive model application 118 may also receive information from the input counter 202 and the output counter 204 for diagnostic analyses. In other embodiments, however, operation scheduling application 120 may also be configured to employ the drive model application 118 for ordering the I/O operations for transmission to the memory drive 126.

It is contemplated that, in some embodiments of the present technology, the at least one respective drive model application 118 may be implemented as part of the Pdrive application 116. In other words, the above-mentioned functionalities of the at least one respective drive model application 118 may be performed by the Pdrive application 116, without departing from the scope of the present technology.

Figure 3:
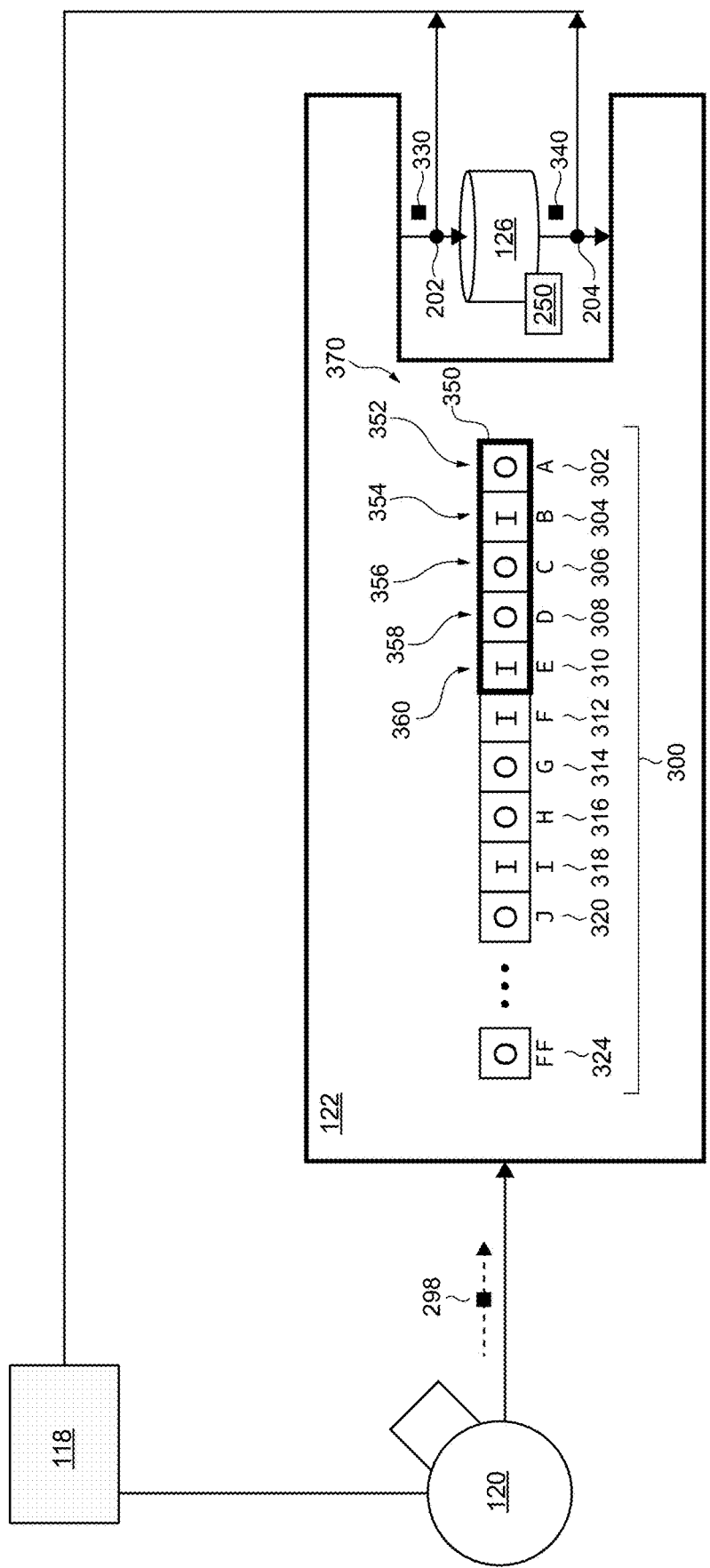
FIG. 3 depicts a schematic representation of a real-time operation enforcing application executed by the distributed computer-processing system of FIG. 1 in accordance with non-limiting embodiments of the present technology.

Now turning to FIG. 3, there is depicted a schematic diagram of the real-time operation enforcing application 122, the drive model application 118, and the operation scheduling application 120, both implemented in accordance with non-limiting embodiments of the present technology.

The real-time operation enforcing application 122 may receive a plurality of sequential I/O operations 300 from the operation scheduling application 120 via a data packet 298. Even though a single data packet 298 is depicted, in operation, a plurality of data packets 298 may be received at different points in time.

A number of I/O operations in the plurality of sequential I/O operations 300 may be predetermined, and may depend on how the memory drive 126 is implemented. As a non-limiting example, in embodiments where the memory drive 126 is implemented as a HDD, the plurality of sequential I/O operations 300 may include at most 32 I/O operations. As another non-limiting example, in embodiments where the memory drive 126 is implemented as a SSD, the plurality of sequential I/O operations 300 may include at most 128 I/O operations.

As illustrated herein, each I/O operation in the plurality of sequential I/O operations 300 is associated with a respective position, starting from position A, corresponding to a first operation 302 at the rightmost, followed by position B, corresponding to a second operation 304, followed by position C, corresponding to a third operation 306, followed by position D, corresponding to a fourth operation 308, followed by position E, corresponding to a fifth operation 310, followed by position F, corresponding to a sixth operation 312, followed by position G, corresponding to a seventh operation 314, followed by position H, corresponding to an eighth operation 316, followed by position I, corresponding to a ninth operation 318, followed by position J, corresponding to a tenth operation 320, and going to position FF, corresponding to a thirty second operation 324 at the leftmost. Generally speaking, an I/O operation on the right is associated with a higher priority of transmission than an I/O operation on its left.

The real-time operation enforcing application 122 is configured to apply a slidable cell window 350 on the plurality of sequential I/O operations 300 to select a predetermined number of sequential I/O operations from the plurality of sequential I/O operations 300 for transmission to the memory drive 126 for execution. In some embodiments, the slidable cell window 350 may be implemented as a state machine.

The slidable cell window 350 includes a predetermined number of N cells corresponding to or being associated with N sequential I/O operations of the plurality of sequential I/O operations 300. Thus, a given cell of the slidable cell window 350 may corresponds to one I/O operation of the plurality of sequential I/O operations 300. As illustrated herein, the slidable cell window 350 includes five cells: a first cell 352, a second cell 354, a third cell 356, a fourth cell 358, and a fifth cell 360. It is contemplated that in alternative non-limiting embodiments of the present technology, the slidable cell window 350 may include fewer than five cells, or more than five cells.

The real-time operation enforcing application 122 may position the slidable cell window 350 at a first position 370 over sequential operations of the plurality of sequential I/O operations 300, starting on the rightmost of the plurality of sequential I/O operations 300, such that the first cell 352 is positioned at position A over the first operation 302, the second cell 354 is positioned at position B over the second operation 304, the third cell 356 is positioned at position C over the third operation 306, the fourth cell 358 is positioned at position D over the fourth operation 308, and the fifth cell 360 is positioned at position E over the fifth operation 310. Thus, it may be said that I/O operations over which the slidable cell window 350 is positioned over are I/O operations "included" in the slidable cell window 350 or "associated with" with the slidable cell window 350.

The real-time operation enforcing application 122 may transmit the I/O operations associated with the slidable cell window 350 to the memory drive 126 via a data packet 330. Even though a single data packet 330 is depicted, in operation, a plurality of data packets 330 may be transmitted at different points in time, each of which will be referred herein below as the the data packet 330.

The memory drive 126 may receive the data packet 330, the data packet 330 including the I/O operations associated with the slidable cell window 350, namely the first operation 302, the second operation 304, the third operation 306, the fourth operation 308, and the fifth operation 310. The drive-internal logic 250 of the memory drive 126 may select a most efficient I/O operation for current execution among the first operation 302, the second operation 304, the third operation 306, the fourth operation 308, and the fifth operation 310. How the memory drive 126 selects the most efficient I/O operation is not particularly limited and may be implemented using any known prior art technique.

Upon execution of the most efficient operation of the I/O operations associated with the slidable cell window 350 according to the drive-internal logic 250, the memory drive 126 may transmit an execution confirmation to the real-time operation enforcing application 122 via a confirmation data packet 340. In some embodiments, the execution confirmation via the confirmation data packet 340 may include a plurality of execution confirmations corresponding to execution of a plurality of I/O operations associated with the slidable cell window 350.

In some embodiments, execution of one or more I/O operations by the memory drive 126 may fail for a variety of reasons, and the memory drive 126 may transmit an execution failure to the real-time operation enforcing application 122 via the confirmation data packet 340. Additionally, or alternatively, the drive model application 118 may analyze operation of the memory drive 126 and report diagnostic analyses of I/O execution failures to the operation scheduling application 120 and/or the real-time operation enforcing application 122.

The real-time operation enforcing application 122 may receive the confirmation data packet 340, and determine, a position of the I/O operation that has been executed by the memory drive 126. In some embodiments, transmission of an I/O operation by the real-time operation enforcing application 122 to the memory drive 126 via data packet 330 may be executed at the same time the execution confirmation is received via confirmation data packet 340. Even though a single confirmation data packet 340 is depicted, in operation, a plurality of confirmation data packet 340 may be transmitted at different points in time, each of which will be referred herein below as the confirmation data packet 340.

Generally speaking, the real-time operation enforcing application 122 may slide the slidable cell window 350 over the plurality of sequential I/O operations 300 from a current position, i.e. a first position 370, only if the position of the I/O operation that has been executed by the memory drive 126 is associated with the first cell 352 of the slidable cell window 350, i.e. position A or the first operation 302 as illustrated herein. Further, the real-time operation enforcing application 122 may slide the slidable cell window 350 over more than one I/O operation if at least one immediately sequential operation to the first operation 302 in the plurality of sequential I/O operations 300 has also been executed. Starting from the first cell 352, if one or more immediately sequential I/O operations have been executed by the memory drive 126, the real-time operation enforcing application 122 may slide the slidable cell window 350 over a same number of cells, such that the first cell 352 is positioned over an immediately sequential I/O operation that has not been previously executed.

If the position of the I/O operation that has been executed by the memory drive 126 is not associated with to the first cell 352, i.e. the position is associated with one of the second cell 354, the third cell 356, the fourth cell 358, and the fifth cell 360, the real-time operation enforcing application 122 maintains the slidable cell window 350 at its current position or otherwise "blocks" the slidable cell window 350 from sliding over the plurality of sequential I/O operations 300.

In order to fully appreciate implementations of the present technology, different scenarios of how the real-time operation enforcing application 122 operates the slidable cell window 350 to transmit I/O operations for execution by the memory drive 126 will be described in more detail with reference to FIG. 4 and FIG. 5.

Figure 4:
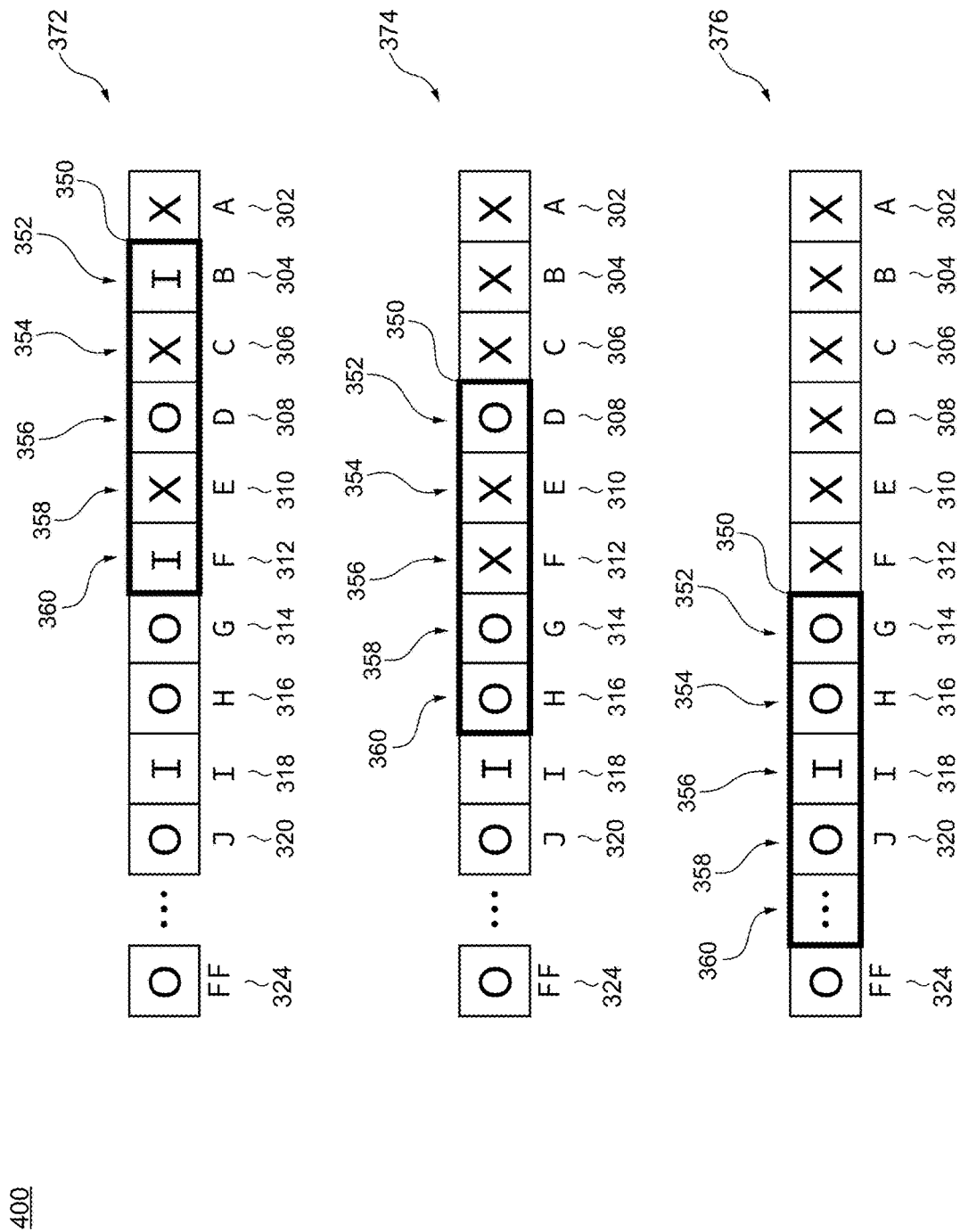
FIG. 4 depicts a schematic representation of a first scenario of operation of the real-time operation enforcing application of the distributed computer-processing system of FIG. 1 in accordance with non-limiting embodiments of the present technology.

FIG. 4 depicts a schematic diagram of a first scenario of operation 400 of the slidable cell window 350 by the real-time operation enforcing application 122 in accordance with non-limiting embodiments of the present technology.

As a first non-limiting example, the drive-internal logic 250 of the memory drive 126 may select the first operation 302 as the most efficient operation to execute among the first operation 302, the second operation 304, the third operation 306, the fourth operation 308, and the fifth operation 310. The memory drive 126 may execute the first operation 302, and transmit an execution confirmation to the real-time operation enforcing application 122 via the confirmation data packet 340.

The real-time operation enforcing application 122 may determine, based on the confirmation data packet 340, that the position of the I/O operation that has been executed by the memory drive 126 is the first operation 302, which is associated with the first cell 352 (executed I/O operations are marked as an "X" in FIG. 4).

Consequently, the real-time operation enforcing application 122 may slide the slidable cell window 350 over the plurality of sequential I/O operations 300 to include at least one additional I/O operation, the at least one additional I/O operation being immediately sequential in the plurality of sequential I/O operations 300.

The real-time operation enforcing application 122 may slide the slidable cell window 350 from its current position, the first position 370, to a second position 372 to include the next I/O operation in the sequence, the sixth operation 312. At the second position 372, the first cell 352 is positioned at position B over the second operation 304, the second cell 354 is positioned at position C over the third operation 306, the third cell 356 is positioned at position D over the fourth operation 308, the fourth cell 358 is positioned at position E over the fifth operation 310, and the fifth cell 360 is positioned at position F over the sixth operation 312, the sixth operation 312 not having been previously executed and being immediately sequential to the fifth operation 310.

Upon sliding to the second position 372, the real-time operation enforcing application 122 may transmit the sixth operation 312 to the memory drive 126 via the data packet 330.

The memory drive 126 may receive the data packet 330, and the drive-internal logic 250 of the memory drive 126 may add the sixth operation 312 to the remaining operations, i.e. the second operation 304, the third operation 306, the fourth operation 308, and the fifth operation 310. The drive-internal logic 250 of the memory drive 126 may select a most efficient I/O operation to execute among the second operation 304, the third operation 306, the fourth operation 308, the fifth operation 310, and the sixth operation 312.

The drive-internal logic 250 may chose the third operation 306 for execution by the memory drive 126. The memory drive 126 may execute the third operation 306, and transmit an execution confirmation to the real-time operation enforcing application 122 via the confirmation data packet 340.

The real-time operation enforcing application 122 may determine, based on the confirmation data packet 340, that the position of the I/O operation that has been executed by the memory drive 126 is the third operation 306, which is associated with the second cell 354. Since the position of the I/O operation that has been executed by the memory drive 126 does not correspond to the first cell 352, the real-time operation enforcing application 122 may maintain the slidable cell window 350 at the second position 372. Accordingly, since the slidable cell window 350 is maintained at the second position 372, the real-time operation enforcing application 122 may not send any additional I/O operation to the memory drive 126.

The drive-internal logic 250 of the memory drive 126 may select another most efficient I/O operation to execute among the second operation 304, the fourth operation 308, the fifth operation 310, and the sixth operation 312.

The drive-internal logic 250 may chose the fifth operation 310 for execution by the memory drive 126. The memory drive 126 may execute the fifth operation 310, and transmit an execution confirmation to the real-time operation enforcing application 122 via the confirmation data packet 340.

The real-time operation enforcing application 122 may determine, based on the confirmation data packet 340, that the position of the I/O operation that has been executed by the memory drive 126 is the fifth operation 310, which is associated with the fourth cell 358. Since the position of the I/O operation that has been executed by the memory drive 126 does not correspond to the first cell 352, the real-time operation enforcing application 122 may maintain the slidable cell window 350 at the second position 372. Accordingly, since the slidable cell window 350 is maintained at the second position 372, the real-time operation enforcing application 122 may not send any additional I/O operation to the memory drive 126.

The drive-internal logic 250 of the memory drive 126 may select another most efficient I/O operation to execute among the second operation 304, the fourth operation 308, and the sixth operation 312.

The drive-internal logic 250 may chose the second operation 304 for execution by the memory drive 126. The memory drive 126 may execute the second operation 304, and transmit an execution confirmation to the real-time operation enforcing application 122 via the confirmation data packet 340.

The real-time operation enforcing application 122 may receive the confirmation data packet 340, and may determine, based on the confirmation data packet 340, that the I/O operation that has been executed by the memory drive 126 is the second operation 304, which is associated with the first cell 352.

Upon determining that the I/O operation corresponding to the first cell 352 has been executed by the memory drive 126, the real-time operation enforcing application 122 slides the slidable cell window 350 over the plurality of sequential I/O operations 300 to include at least one additional I/O operation, the at least one additional I/O operation being immediately sequential in the plurality of sequential I/O operations 300.

Thus, the real-time operation enforcing application 122 may slide the slidable cell window 350 from its current position, the second position 372, to a third position 374. Since the third operation 306, which is immediately sequential to the second operation 304, has been previously executed by the memory drive 126 and is an immediately sequential I/O operation, the real-time operation enforcing application 122 may slide the slidable cell window 350 such that the first cell 352 is associated with an I/O operation that has not been previously executed, i.e. the fourth operation 308.

At the third position 374, the first cell 352 is positioned at position D over the fourth operation 308, the second cell 354 is positioned at position E over the fifth operation 310, the third cell 356 is positioned at position F over the sixth operation 312, the fourth cell 358 is positioned at position G over the seventh operation 314, and the fifth cell 360 is positioned at position H over the eighth operation 316, where the seventh operation 314, and the eighth operation 316 are the additional immediately sequential I/O operations that have not been previously executed by the memory drive 126.

Upon sliding to the third position 374, the real-time operation enforcing application 122 may transmit the seventh operation 314, and the eighth operation 316 to the memory drive 126 via data packet 330, as the seventh operation 314 and the eighth operation 316 are I/O operations included in the slidable cell window 350 that have not been previously transmitted to the memory drive 126.

The drive-internal logic 250 of the memory drive 126 may select another most efficient I/O operation to execute among the fourth operation 308, the sixth operation 312, the seventh operation 314, and the eighth operation 316.

The drive-internal logic 250 may chose the sixth operation 312 for execution by the memory drive 126. The memory drive 126 may execute the sixth operation 312, and transmit an execution confirmation to the real-time operation enforcing application 122 via the confirmation data packet 340.

The real-time operation enforcing application 122 may receive the confirmation data packet 340, and may determine, that the I/O operation that has been executed by the memory drive 126 is the sixth operation 312, which is associated with the third cell 356. Since the position of the sixth operation 312 that has been executed by the memory drive 126 does not correspond to the first cell 352, the real-time operation enforcing application 122 may maintain the slidable cell window 350 at the third position 374. Accordingly, since the slidable cell window 350 is maintained at the second position 372, the real-time operation enforcing application 122 may not send any additional I/O operation to the memory drive 126.

The drive-internal logic 250 of the memory drive 126 may select another most efficient I/O operation to execute among the fourth operation 308, the seventh operation 314, and the eighth operation 316.

The drive-internal logic 250 may chose the fourth operation 308 for execution by the memory drive 126. The memory drive 126 may execute the fourth operation 308, and transmit an execution confirmation to the real-time operation enforcing application 122 via the confirmation data packet 340.

The real-time operation enforcing application 122 may receive the confirmation data packet 340, and may determine, based on the confirmation data packet 340, that the position of the I/O operation that has been executed by the memory drive 126 is the fourth operation 308, which is associated with the first cell 352.

Upon determining that the I/O operation corresponding to the first cell 352 has been executed by the memory drive 126, the real-time operation enforcing application 122 may slide the slidable cell window 350 over the plurality of sequential I/O operations 300 to include at least one additional I/O operation, the at least one additional I/O operation being immediately sequential in the plurality of sequential I/O operations 300.

Thus, the real-time operation enforcing application 122 may slide the slidable cell window 350 from its current position, the third position 374 to a fourth position 376. Since the fifth operation 310, which is immediately sequential to the fourth operation 308, and the sixth operation 312, which is immediately sequential to the fifth operation 310, have been previously executed by the memory drive 126, the real-time operation enforcing application 122 may slide the slidable cell window 350 such that the first cell 352 is associated with a sequential operation that has not been previously executed, i.e. the seventh operation 314.

Thus, at the fourth position 376, the first cell 352 is positioned at position G over the seventh operation 314, the second cell 354 is positioned at position H over the eighth operation 316, the third cell 356 is positioned at position I over the ninth operation 318, the fourth cell 358 is positioned at position J over the tenth operation 320, and the fifth cell 360 is positioned at position K (not depicted) over the eleventh operation (not depicted), where the ninth operation 318, the tenth operation 320, and the eleventh operation (not depicted) are the additional immediately sequential I/O operations that have not been previously executed by the memory drive 126.

Upon sliding to the fourth position 376, the real-time operation enforcing application 122 may transmit the ninth operation 318, the tenth operation 320, and the eleventh operation (not depicted) to the memory drive 126 via data packet 330, as the ninth operation 318, the tenth operation 320, and the eleventh operation (not depicted) are immediately sequential I/O operations included in the slidable cell window 350 that have not been previously transmitted to the memory drive 126.

The real-time operation enforcing application 122 may continue the process in a similar manner until an entirety of the plurality of sequential I/O operations 300 have been executed by the memory drive 126.

Figure 5:
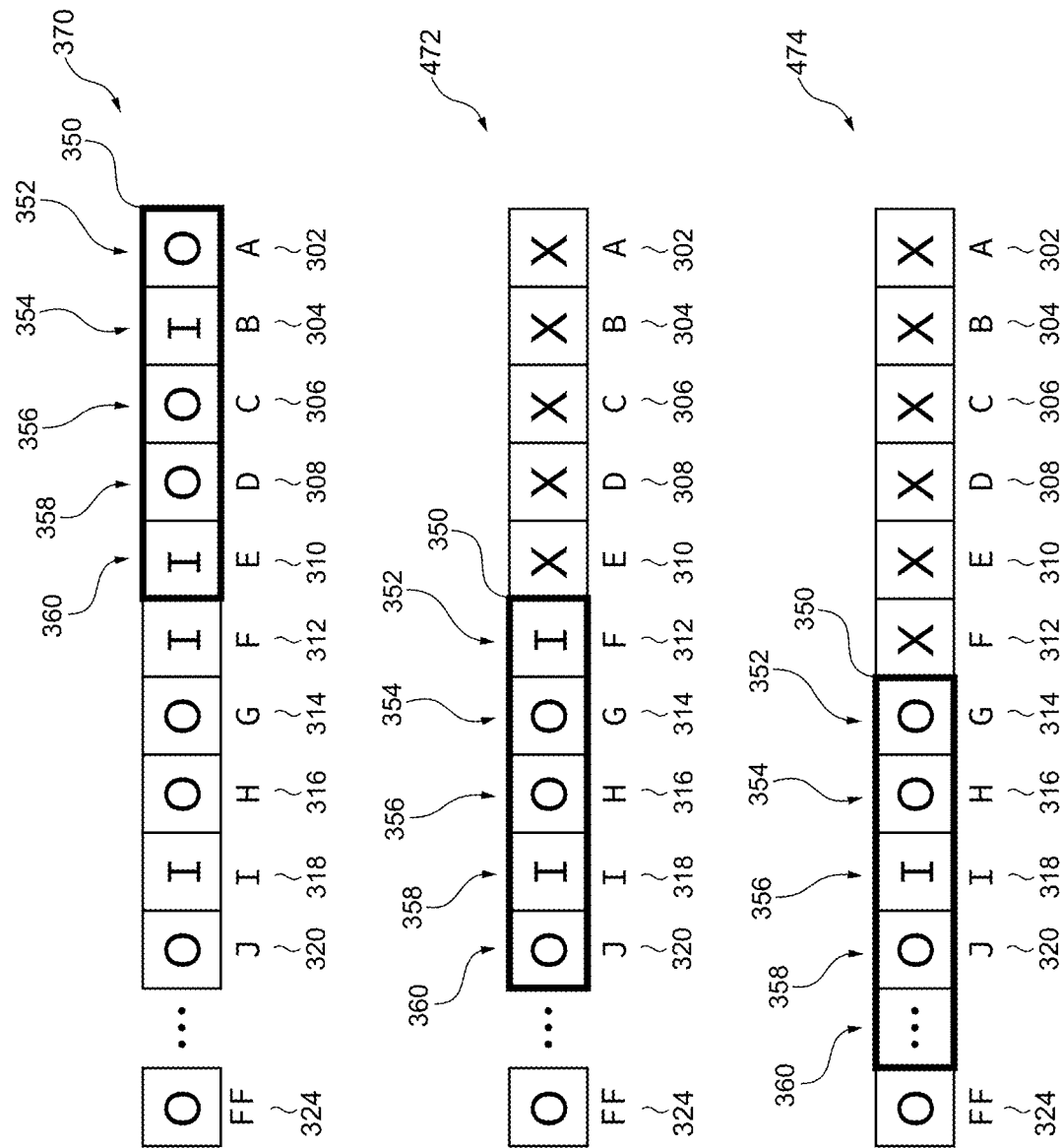
FIG. 5 depicts a schematic representation of a second scenario of operation of the real-time operation enforcing application of the distributed computer-processing system of FIG. 1 in accordance with non-limiting embodiments of the present technology.

FIG. 5 depicts a schematic diagram of a second scenario 500 of operation of the slidable cell window 350 by the real-time operation enforcing application 122 in accordance with non-limiting embodiments of the present technology.

As a second non-limiting example, the drive-internal logic 250 of the memory drive 126 may select the second operation 304 as the most efficient operation to execute among the first operation 302, the second operation 304, the third operation 306, the fourth operation 308, and the fifth operation 310. The memory drive 126 may execute the second operation 304, and transmit an execution confirmation to the real-time operation enforcing application 122 via confirmation data packet 340.

The real-time operation enforcing application 122 may determine, based on the confirmation data packet 340, that the position of the I/O operation that has been executed by the memory drive 126 is the second operation 304, which is associated with the second cell 354 (executed I/O operations are marked as an "X" in FIG. 5). Since the position of the I/O operation that has been executed by the memory drive 126 does not correspond to the first cell 352, the real-time operation enforcing application 122 maintains the slidable cell window 350 at the first position 370. Accordingly, since the slidable cell window 350 is maintained at the first position 370, the real-time operation enforcing application 122 does not send any additional I/O operation to the memory drive 126.

The drive-internal logic 250 may chose the third operation 306 for execution by the memory drive 126. The memory drive 126 may execute the third operation 306, and transmit an execution confirmation to the real-time operation enforcing application 122 via the confirmation data packet 340.

The real-time operation enforcing application 122 determines, based on the confirmation data packet 340, that the position of the I/O operation that has been executed by the memory drive 126 is the third operation 306, which is associated with the third cell 356 of the slidable cell window 350. Since the position of the I/O operation that has been executed by the memory drive 126 does not correspond to the first cell 352, the real-time operation enforcing application 122 maintains the slidable cell window 350 at the first position 370. Accordingly, since the slidable cell window 350 is maintained at the first position 370, the real-time operation enforcing application 122 does not send any additional I/O operation to the memory drive 126.

The drive-internal logic 250 may chose the fifth operation 310, and the second operation 304 for execution by the memory drive 126. The memory drive 126 may execute the fifth operation 310, and the second operation 304 and transmit an execution confirmation to the real-time operation enforcing application 122 via the confirmation data packet 340.

The real-time operation enforcing application 122 determines, based on the confirmation data packet 340, that the positions of the I/O operation that has been executed by the memory drive 126 corresponds to the fifth operation 310 and the second operation 304, which are associated with the fifth cell 360 and the second cell 354 of the slidable cell window 350, respectively. Since the positions of the I/O operations that have been executed by the memory drive 126 do not correspond to the first cell 352, the real-time operation enforcing application 122 maintains the slidable cell window 350 at the first position 370. Accordingly, since the slidable cell window 350 is maintained at the first position 370, the real-time operation enforcing application 122 does not send any additional I/O operation to the memory drive 126.

The drive-internal logic 250 may chose the first operation 302 for execution by the memory drive 126. The memory drive 126 may execute the first operation 302, and transmit an execution confirmation to the real-time operation enforcing application 122 via the confirmation data packet 340.

The real-time operation enforcing application 122 determines, based on the confirmation data packet 340, that the position of the I/O operation that has been executed by the memory drive 126 is the first operation 302, which is associated with the first cell 352.

The real-time operation enforcing application 122 slides the slidable cell window 350 over the plurality of sequential I/O operations 300 to include at least one additional I/O operation, the at least one additional I/O operation being immediately sequential in the plurality of sequential I/O operations 300. Thus, the real-time operation enforcing application 122 slides the slidable cell window 350 from its current position, the first position 370, to a second position 472, to include at least one additional I/O operation in the sequence. Since the second operation 304, the third operation 306, the fourth operation 308, and the fifth operation 310 have been previously executed by the memory drive 126, the real-time operation enforcing application 122 may slide the slidable cell window 350 to the next I/O operation in the plurality of sequential I/O operations 300 that has not been previously executed, i.e. the sixth operation 312.

Thus, at the second position 472, the first cell 352 is positioned at position F over the sixth operation 312, the second cell 354 is positioned at position G over the seventh operation 314, the third cell 356 is positioned at position H over eighth operation 316, the fourth cell 358 is positioned at position I over the ninth operation 318, and the fifth cell 360 is positioned at position J over the tenth operation 320. Therefore, the number of cells that the slidable cell window 350 has been moved by corresponds to the number of immediately sequential "empty" cells (marked by "X" in the second position 472) associated with I/O operations that have been executed.

Upon sliding to the second position 472, the real-time operation enforcing application 122 transmits the sixth operation 312, the seventh operation 314, the eighth operation 316, the ninth operation 318, and the tenth operation 320 to the memory drive 126 via data packet 330, as the sixth operation 312, the seventh operation 314, the eighth operation 316, the ninth operation 318, and the tenth operation 320 are I/O operations included in the slidable cell window 350 that have not been previously transmitted to the memory drive 126.

The drive-internal logic 250 of the memory drive 126 may select a most efficient I/O operation to execute among the sixth operation 312, the seventh operation 314, the eighth operation 316, the ninth operation 318, and the tenth operation 320

The drive-internal logic 250 may chose the sixth operation 312 for execution by the memory drive 126. The memory drive 126 may execute the sixth operation 312, and transmit an execution confirmation to the real-time operation enforcing application 122 via the confirmation data packet 340.

The real-time operation enforcing application 122 may determine, based on the confirmation data packet 340, that the I/O operation that has been executed by the memory drive 126 is the sixth operation 312, which is associated with the first cell 352.

The real-time operation enforcing application 122 slides the slidable cell window 350 over the plurality of sequential I/O operations 300 to include at least one additional I/O operation, the at least one additional I/O operation being immediately sequential in the plurality of sequential I/O operations 300. Thus, the real-time operation enforcing application 122 may slide the slidable cell window 350 from its current position, the second position 472, to a third position 474, to include at least one additional I/O operation in the sequence. The real-time operation enforcing application 122 may slide the slidable cell window 350 to include the next I/O operation in the plurality of sequential I/O operations 300 that has not been previously executed, i.e. the eleventh operation (not depicted).

Thus, at the third position 474, the first cell 352 is positioned at position G over the seventh operation 314, the second cell 354 is positioned at position H over the eighth operation 316, the third cell 356 is positioned at position I over the ninth operation 318, the fourth cell 358 is positioned at position J over the tenth operation 320, and the fifth cell 360 is positioned at position K (not depicted) over the eleventh operation (not depicted), where the ninth operation 318, the tenth operation 320, and the eleventh operation (not depicted) are the additional immediately sequential I/O operations that have not been previously executed by the memory drive 126.

Upon sliding to the third position 474, the real-time operation enforcing application 122 transmits the eleventh operation (not depicted) to the memory drive 126 via data packet 330, as the eleventh operation (not depicted) are is an I/O operation included in the slidable cell window 350 that has not been previously transmitted to the memory drive 126.

The real-time operation enforcing application 122 may continue the process in a similar manner until an entirety of the plurality of sequential I/O operations 300 have been executed by the memory drive 126. It should be noted that in some embodiments of the present technology, a given cell of the slidable cell window 350 may be positioned over an I/O operation that has not yet been received by the real-time operation enforcing application 122 from the operation scheduling application 120 for a variety of reasons. In such cases, the real-time operation enforcing application 122 may transmit the I/O operation as soon as it is received from the operation scheduling application 120.

Figure 6:
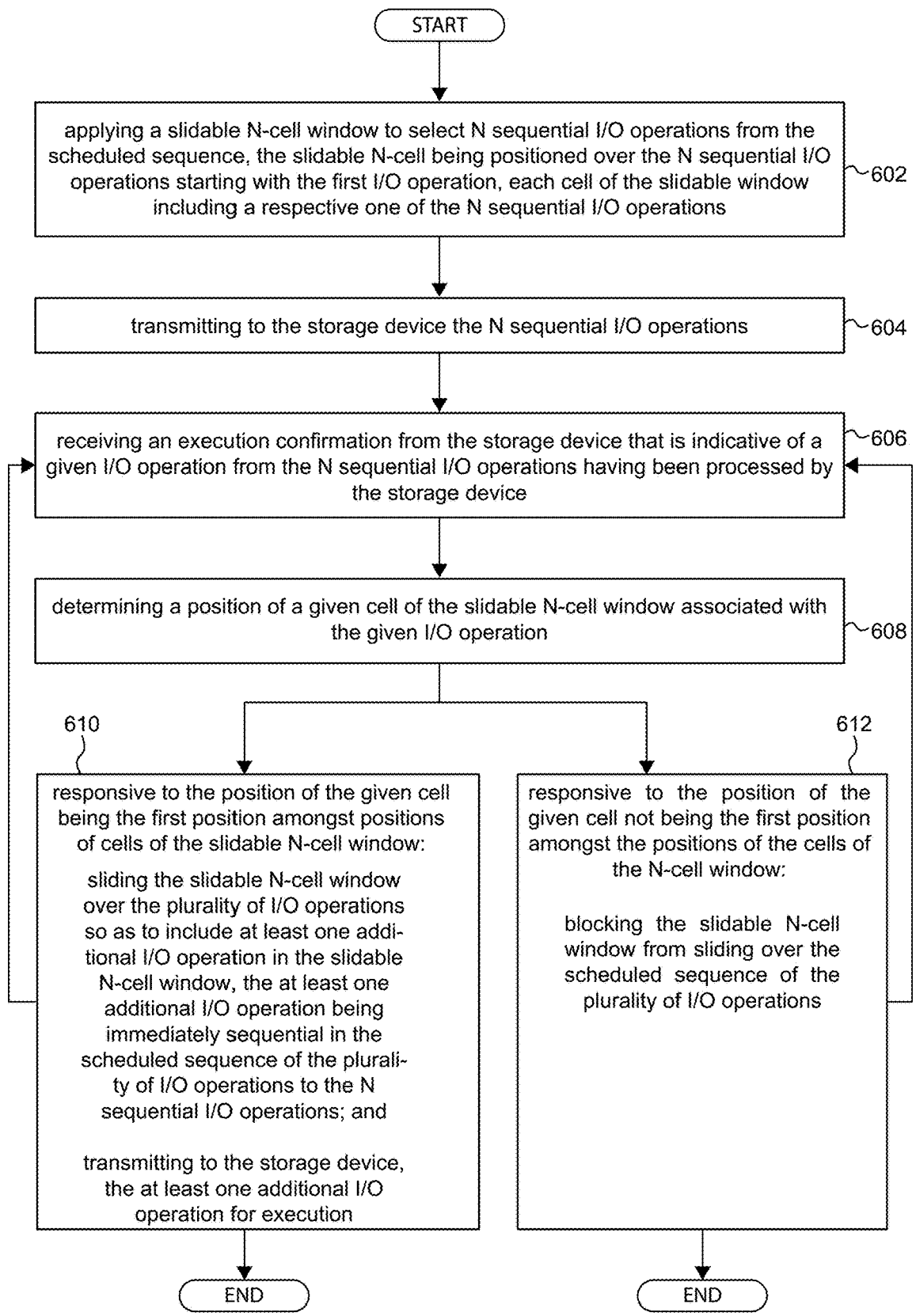
FIG. 6 depicts a block diagram of a method for scheduling transmission of a plurality of I/O operations for execution by a storage device, the method executable within the system of FIG. 1 in accordance with embodiments of the present technology.

Now turning to FIG. 6, there is depicted a flowchart of a method 600 of scheduling transmission of a plurality of sequential I/O operations 300 to be executed by a memory drive 126 in accordance to non-limiting embodiments of the present technology.

The method 600 may be executed by a real-time operation enforcing application 122 after having received the plurality of sequential I/O operations 300 from the operation scheduling application 120.

The method 600 may begin at step 602.

STEP 602: Applying a Slidable N-Cell Window to Select N Sequential I/O Operations from the Scheduled Sequence, the Slidable N-Cell Being Positioned Over the N Sequential I/O Operations Starting with the First I/O Operation, Each Cell of the Slidable Window Including a Respective One of the N Sequential I/O Operations At step 602, the real-time operation enforcing application 122 may apply a slidable cell window 350 to select N sequential I/O operations from the plurality of sequential I/O operations 300, the slidable cell window 350 being positioned over five sequential I/O operations starting with the first cell 352 being positioned over the first operation 302, and where the second cell 354 is positioned over the second operation 304, the third cell 356 is positioned over the third operation 306, the fourth cell 358 is positioned over the fourth operation 308, and the fifth cell 360 is positioned over the fifth operation 310

The method 600 may then advance to step 604.

STEP 604: Transmitting to the Storage Device the N Sequential I/O Operations

At step 604, the real-time operation enforcing application 122 may transmit to the memory drive 126, via a data packet 330, the first operation 302, the second operation 304, the third operation 306, the fourth operation 308, and the fifth operation 310.

The method 600 may then advance to step 606.

STEP 606: Receiving an Execution Confirmation from the Storage Device that is Indicative of a Given I/O Operation from the N Sequential I/O Operations having Been Processed by the Storage Device At step 606, the real-time operation enforcing application 122 may receive, via a confirmation data packet 340, an execution confirmation of a given I/O operation among the first operation 302, the second operation 304, the third operation 306, the fourth operation 308, and the fifth operation 310 that has been selected by the drive-internal logic 250 of the memory drive 126 for execution.

The method 600 may then advance to step 608.

STEP 608: Determining a Position of a Given Cell of the Slidable N-Cell Window Associated with the Given I/O Operation At step 608, the real-time operation enforcing application 122 may determine, based on the confirmation data packet 340, a position of a given cell associated with the given I/O operation having been executed by the memory drive 126 among the first cell 352, the second cell 354, the third cell 356, the fourth cell 358, and the fifth cell 360.

The method 600 may then advance to step 610 or step 612.

STEP 610: Responsive to the Position of the Given Cell Being the First Position Amongst Positions of Cells of the Slidable N-Cell Window:

sliding the slidable N-cell window over the plurality of I/O operations so as to include at least one additional I/O operation in the slidable N-cell window, the at least one additional I/O operation being immediately sequential in the scheduled sequence of the plurality of I/O operations to the N sequential I/O operations; and transmitting to the storage device, the at least one additional I/O operation for execution.

At step 610, in response to the position of the given cell being the first cell 352 of the slidable cell window 350, the real-time operation enforcing application 122 may slide the slidable cell window 350 over the plurality of sequential I/O operations 300 to include at least one additional I/O operation, the at least one additional I/O operation being immediately sequential in the plurality of sequential I/O operations 300. As a non-limiting example, in response to the I/O operation being the first operation 302 corresponding to the first cell 352, the real-time operation enforcing application 122 may slide the slidable cell window 350 such that the first cell 352 is positioned over the second operation 304, the second cell 354 is positioned over the third operation 306, the third cell 356 is positioned over the fourth operation 308, the fourth cell 358 is positioned over the fifth operation 310, and the fifth cell 360 is positioned over the sixth operation 312. The real-time operation enforcing application 122 may transmit the sixth operation 312 to the memory drive 126 via data packet 330. The real-time operation enforcing application 122 may transmit the sixth operation 312 to the memory drive 126 via data packet 330 at the same time as it receives, via the confirmation data packet 340, an execution confirmation of a given I/O operation.

Step 610 may be executed every time an execution confirmation for the first cell 352 is received.

STEP 612: Responsive to the Position of the Given Cell Not Being the First Position Amongst the Positions of the Cells of the N-Cell Window: Blocking the Slidable N-Cell Window from Sliding Over the Scheduled Sequence of the Plurality of I/O Operations.

At step 612, in response to the position of the given cell not being the first cell 352 of the slidable cell window 350, the real-time operation enforcing application 122 may block the slidable cell window 350 from sliding over the plurality of sequential I/O operations 300.

Step 612 may be executed every time an execution confirmation for a cell other than the first cell 352 is received.

The method 600 may then end.

It should be apparent to those skilled in the art that at least some embodiments of the present technology aim to expand a range of technical solutions for addressing a particular technical problem, namely improving transmission of Input/Output (I/O) operations to an uncontrolled device, such as a storage disk, by applying a sliding window over a sequence of I/O operations, which may optimize computational resource and computational time.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of scheduling transmission of a plurality of input/output (I/O) operations to be executed by a storage device, the storage device being part of a computer system having:

an operations scheduler executing a scheduling algorithm for scheduling the plurality of I/O operations for transmission to the storage device, the operations scheduler being configured to generate a scheduled sequence having the plurality of I/O operations ordered starting with a first I/O operation to be transmitted and finishing with a last I/O operation to be transmitted;

an I/O operations dispatch controller communicatively coupled to the operations scheduler and the storage device;

the storage device being configured to execute an execution order algorithm to determine an execution order of I/O operations having been transmitted from the operations scheduler for execution;

the method executable by the I/O operations dispatch controller, the method comprising:

applying a slidable N-cell window to select N sequential I/O operations from the scheduled sequence, the slidable N-cell being positioned over the N sequential I/O operations starting with the first I/O operation, each cell of the slidable window including a respective one of the N sequential I/O operations;

transmitting to the storage device the N sequential I/O operations;

receiving an execution confirmation from the storage device that is indicative of a given I/O operation from the N sequential I/O operations having been processed by the storage device;

determining a position of a given cell of the slidable N-cell window associated with the given I/O operation;

responsive to the position of the given cell being the first position amongst positions of cells of the slidable N-cell window:

sliding the slidable N-cell window over the plurality of I/O operations so as to include at least one additional I/O operation in the slidable N-cell window, the at least one additional I/O operation being immediately sequential in the scheduled sequence of the plurality of I/O operations to the N sequential I/O operations; and transmitting to the storage device, the at least one additional I/O operation for execution.

2. The method of claim 1, wherein the method further comprises:

responsive to the position of the given cell not being the first position amongst the positions of the cells of the N-cell window:

blocking the slidable N-cell window from sliding over the scheduled sequence of the plurality of I/O operations.

3. The method of claim 1, wherein the at least one additional I/O operation is present within the scheduled sequence and wherein the transmitting the at least one additional I/O operation to the storage device is executed at the same time as the execution confirmation is received.

4. The method of claim 1, wherein the at least one additional I/O operation is not present within the scheduled sequence and wherein the transmitting the at least one additional I/O operation to the storage device is executed after the execution confirmation is received as soon as the at least one additional I/O operation is received from the operations scheduler and is added to the scheduled sequence.

5. The method of claim 1, wherein the receiving the execution confirmation comprises receiving a plurality of confirmations corresponding to a plurality of sequential I/O operations from the N sequential I/O operations having been processed by the storage device, and wherein the sliding of the slidable window is executed over a number of X-cells, the number of X-cells corresponding to a number of executed sequential I/O operations in the plurality of I/O operations starting with the first I/O operation.

6. The method of claim 1, wherein the I/O operations dispatch controller is implemented as a software module.

7. The method of claim 6, wherein the software module is located on the storage device.

8. The method of claim 1, wherein the I/O operations dispatch controller is implemented as a state machine.

9. The method of claim 1, wherein the scheduling algorithm is FAIR-principle based.

10. The method of claim 1, wherein the storage device is implemented as a fault tolerant device.

11. The method of claim 1, wherein the execution order algorithm is uncontrollable by the task scheduler.

12. The method of claim 1, wherein the method further comprises executing, by the storage device the given I/O operation.

13. The method of claim 1, wherein the method further comprises transmitting, by the storage device to the I/O operations dispatch controller, information indicative of the given I/O operation having been executed.

14. A system for scheduling transmission of a plurality of input/output (I/O) operations to be executed by a storage device connected to the system, the system having:

an operations scheduler executing a scheduling algorithm for scheduling the plurality of I/O operations for transmission to the storage device, the operations scheduler being configured to generate a scheduled sequence having the plurality of I/O operations ordered starting with a first I/O operation to be transmitted and finishing with a last I/O operation to be transmitted;

an I/O operations dispatch controller communicatively coupled to the operations scheduler and the storage device, the storage device being configured to execute an execution order algorithm to determine an execution order of I/O operations having been transmitted from the operations scheduler for execution, the system comprising:

a processor;

a non-transitory computer-readable medium comprising instructions;

the processor, upon executing the instructions, being configured to cause the I/O operations dispatch controller to:

apply a slidable N-cell window to select N sequential I/O operations from the scheduled sequence, the slidable N-cell being positioned over the N sequential I/O operations starting with the first I/O operation, each cell of the slidable window including a respective one of the N sequential I/O operations;

transmit to the storage device the N sequential I/O operations;

receive an execution confirmation from the storage device that is indicative of a given I/O operation from the N sequential I/O operations having been processed by the storage device;

determine a position of a given cell of the slidable N-cell window associated with the given I/O operation;

responsive to the position of the given cell being the first position amongst positions of cells of the slidable N-cell window:

slide the slidable N-cell window over the plurality of I/O operations so as to include at least one additional I/O operation in the slidable N-cell window, the at least one additional I/O operation being immediately sequential in the scheduled sequence of the plurality of I/O operations to the N sequential I/O operations; and transmit to the storage device, the at least one additional I/O operation for execution.

15. The system of claim 14, wherein the processor is further configured to cause the I/O operations dispatch controller to:

responsive to the position of the given cell not being the first position amongst the positions of the cells of the N-cell window:

block the slidable N-cell window from sliding over the scheduled sequence of the plurality of I/O operations.

16. The system of claim 14, wherein the at least one additional I/O operation is present within the scheduled sequence and wherein the transmitting the at least one additional I/O operation to the storage device is executed at the same time as the execution confirmation is received.

17. The system of claim 14, wherein the at least one additional I/O operation is not present within the scheduled sequence and wherein the transmitting the at least one additional I/O operation to the storage device is executed after the execution confirmation is received as soon as the at least one additional I/O operation is received from the operations scheduler and is added to the scheduled sequence.

18. The system of claim 14, wherein the receiving the execution confirmation comprises receiving a plurality of confirmations corresponding to a plurality of sequential I/O operations from the N sequential I/O operations having been processed by the storage device, and wherein the sliding of the slidable window is executed over a number of X-cells, the number of X-cells corresponding to a number of executed sequential I/O operations in the plurality of I/O operations starting with the first I/O operation.

19. The system of claim 14, wherein the I/O operations dispatch controller is implemented as a software module and wherein the instructions are part of the software module.

20. The system of claim 19, wherein the software module is located on the storage device.

21. The system of claim 14, wherein the I/O operations dispatch controller is implemented as a state machine and wherein the instructions are part of the state machine.

22. The system of claim 14, wherein the scheduling algorithm is FAIR-principle based.

23. The system of claim 14, wherein the storage device is implemented as a fault tolerant device.

24. The system of claim 14, wherein the execution order algorithm is uncontrollable by the task scheduler.

25. The system of claim 14, wherein the processor is further configured to cause the I/O operations to cause execution of the given I/O operation by the storage device.

26. The system of claim 14, wherein the processor is further configured to cause the I/O operations to cause transmission, by the storage device, information indicative of the given I/O operation having been executed.

* * * * *